United States Patent [19]

Misra

[11] 4,238,458

[45] Dec. 9, 1980

[54] PROCESS FOR THE PRODUCTION OF A BASIC CARBONATE OF ALUMINUM AND AN ALKALI OR ALKALI EARTH METAL

[75] Inventor: Chanakya Misra, Orissa, India

[73] Assignee: Swiss Aluminium Ltd., Chippis, Switzerland

[21] Appl. No.: 874,193

[22] Filed: Feb. 1, 1978

[30] Foreign Application Priority Data

Feb. 1, 1977 [CH] Switzerland ........................ 1164/77
Mar. 1, 1977 [DE] Fed. Rep. of Germany ....... 2708861

[51] Int. Cl.³ ........................ C01F 7/00; C01D 7/00; C01D 7/38
[52] U.S. Cl. ...................................... 423/115; 423/123; 423/129; 423/419 P; 423/427; 423/600
[58] Field of Search ..................... 423/419 P, 427, 600, 423/115, 123, 129

[56] References Cited

U.S. PATENT DOCUMENTS

| | | | |
|---|---|---|---|
| 2,783,127 | 2/1957 | Grote | 423/427 |
| 2,783,179 | 2/1957 | Grate | 423/419 P |
| 3,501,264 | 3/1970 | Pilato et al. | 423/419 P |
| 3,518,064 | 6/1970 | Lewin | 423/419 P |
| 3,623,993 | 11/1971 | Pearson | 423/419 P |

*Primary Examiner*—Herbert T. Carter
*Attorney, Agent, or Firm*—Bachman and LaPointe

[57] ABSTRACT

The process of the present invention resides in the production of an extremely pure basic aluminum-sodium carbonate of the dawsonite type. In the process of the present invention, aluminum hydroxide is reacted with an aqueous sodium bi-carbonate solution at a temperature between 160° and 240° C. and at a pressure of 5–50 atm. The reagents from an aqueous suspension which is stirred throughout the duration of the reaction and the temperature of the reaction is chosen in accordance with the length of crystalline fiber which is to be produced.

7 Claims, No Drawings

PROCESS FOR THE PRODUCTION OF A BASIC CARBONATE OF ALUMINUM AND A ALKALI OR ALKALI EARTH METAL

BACKGROUND OF THE INVENTION

The present invention resides in a process for the production of a carbonate of aluminum and an alkali or alkali earth metal, in particular a basic carbonate of aluminum and sodium of the dawsonite type. The following description of the invention and the carrying out of the process is therefore limited to dawsonite.

The composition of the dawsonite (in the following the basic carbonate of aluminum and sodium is expressed as dawsonite) can be represented by the following equivalent formulae:

$Al_2O_3.Na_2O.2CO_2.2H_2O$ or $AlNaO(OH)HCO_3$ or as $AlNa_3(CO_3)_3.2Al(OH)_3$

All three formulae are found frequently in technical literature.

A number of applications has been found for dawsonite e.g. medicaments to counter hyperacidity of the stomach, filler material for light-sensitive papers, additive for lacquers and in the paint manufacturing industry. Recently dawsonite was proposed as a filler material with reinforcing and/or flame retarding properties for polymeric synthetic resins such as polystyrole, polypropylene or polyethylene. As far as its flame retarding properties are concerned, it was already known that a corresponding substance, in which the sodium was replaced by ammonia, would seem to be more suitable for this purpose.

Both natural and synthetic dawsonite occurs in the form of fine needles.

The known processes for producing aluminum-sodium carbonate can be divided into the following three groups:

(a) Reacting an aluminate solution with a sodium bi-carbonate solution (if desired also with a bi-carbonate solution of another alkali or alkali earth metal such as, for example, potassium or magnesium.

(b) Reacting an alumina gel with a bi-carbonate solution of an alkali or alkali earth metal.

(c) Reacting an aluminum salt with a suitable bi-carbonate or carbonate solution, in accordance with the desired molar ratio of $Al/CO_2$.

Unfortunately the product obtained is impure to a greater or lesser extent. In particular, it contains various amounts of aluminum hydroxide.

It has been suggested, for example, that an initial aluminate solution with a high molar ratio of $Na_2O/Al_2O_3$ e.g. 6 could be used as a means for improving the purity of the dawsonite. However, in this case the resultant mother liquors contain large amounts of sodium carbonate and bi-carbonate which are difficult to dipose of economically.

If, on the other hand, a "Bayer" aluminate solution is used as is usually the case, the dawsonite obtained is not only impure but also colored a strong yellow or brown. This discoloration can represent a significant disadvantage, depending on the application.

If an aluminum hydroxide is employed, it must be particularly active if it is to react more or less completely under the conditions used up to now. In other words the starting point must be an alumina gel, with all the well known disadvantages which are associated with this process.

SUMMARY OF THE INVENTION

The object of the present invention is therefore to provide a simple and successful process which overcomes the above mentioned disadvantages. In doing so the starting material is a pure material which can be manufactured employing an inexpensive substance as the source of aluminum, i.e., aluminum tri-hydroxide.

DETAILED DESCRIPTION

The process of the present invention which fulfils the foregoing object is such that the reaction of aluminum hydroxide with a sodium bi-carbonate solution is carried out at a temperature between 160° and 240° C. and at a pressure of 5–50 atm. in an aqueous solution which is agitated by stirring. The temperature of the process is selected in accordance with the desired length of crystal fibers to be produced.

It has been found that the $NaHCO_3$ content of the suspension is usefully between 40 and 250 g/l (0.475–3.0 M). It has also been found that the best results are obtained if the molar ratio $Na_2O/Al_2O_3$ of the reagents lies between 2 and 6.

The reaction is carried out under pressure in a container such as, for example, an autoclave. At the end of the reaction the suspension is cooled to 100° C. or lower, the resultant dawsonite separated from the mother liquor, then washed and dried.

The reaction time i.e. the time for which the suspension is held at the reacting temperature is in fact not critical. In the case of the dawsonite however a reaction time of between 20 and 240 min is recommended. In a reaction time of less than 20 min the conversion is not complete and after 180 min the reaction is almost ended.

The results have shown that the process of the present invention allows a simple way of obtaining a product which is not only very pure and white but which also crystallizes out in fine fibrous-like needles, the length of which depends on the temperature and duration of the reaction. As such, it suggests that interesting possibilities are conceivable.

It has also been shown that prior addition of dawsonite seed crystals to the reacting suspension is of particular advantage in that, amongst other things, it allows the length of the fibrous-shaped crystals to be influenced. These dawsonite seed crystals can be prepared in the course of a previous run of the process. If seeding is desired then the quantity of seed crystals depends principally on the length of fibres desired and can usually vary between 5 and 50% of the weight of the final product.

Obviously the rate of the reaction is larger the finer the grain size of the aluminum hydroxide. This means of course that gel-like aluminum hydroxide can be added as a starting material, but this is not indispensible, crystalline aluminum hydroxide ($Al_2O_3.3H_2O$) can be employed, in particular a well known aluminum hydroxide (alumina hydrate) which is obtained from the "Bayer" process. In this case, which for obvious reasons is in fact the most common, it is sufficient if the aluminum hydroxide is well washed. The aluminum hydroxide can also be used while damp.

The hydroxide should be as fine as possible, in order to increase the rate of reaction. In general this can be achieved by mechanical grinding of the hydroxide. In the case of the "Bayer" hydroxide the starting material can be obtained in a very fine form by employing precipitation conditions which are generally known to produce a fine or very fine hydroxide.

The molar ratio ($Na_2O/Al_2O_3$ or $NaHCO_3/Al(OH)_3$) can also have a certain influence on the resultant product. If in the case of the dawsonite this molar ratio is small i.e. less than 2, then Boehmite, an oxi-hydroxide of aluminum ($Al_2O_3 \cdot H_2O$) is formed, even at temperatures below 150° C. If on the other hand the ratio is more than 6, then the concentration of the suspension must be increased (e.g. by 150 g/l $NaHCO_3$) to achieve a prescribed production volume; in this case the suspension can become too thick and too viscous.

The concentration of the bi-carbonate influences the rate of reaction considerably. This rate is low at concentrations below 40–50 g/l $NaHCO_3$; above 200–250 g/l, depending on the molar ratio adopted, the reaction mixture can become very thick and cause difficulties in handling.

It has already been said that the resultant product is exceptionally pure and almost free of aluminum hydroxide, in contrast to the same kind of product obtained by conventional means. The process presented here produces crystals which grow in the form of needles of greater or shorter length and which are always well formed. They can therefore be easily filtered and washed.

Chemical analysis shows that the composition is very close to that predicted by theory.

The yield obtained in the conversion to dawsonite, under the reaction conditions of the invention presented here, is exceptionally high and is of the order of 98.5–99.5% on the basis of the initial, dry aluminum hydroxide.

The process of the invention can also be carried out in a continuous manner.

Other features and advantages of the invention will now be presented by way of description of a number of examples.

EXAMPLE 1

1.5 l of a sodium bi-carbonate solution which contains 140 g/l $NaHCO_3$ were placed in an autoclave having a 2 l capacity and provided with a stirring device and electrically heated. Next 40 g (weight: $Al(OH)_3$) of fine grained "Bayer" aluminum tri-hydroxide (1–20 μm particle size) was added, and stirred in to form a suspension. The autoclave was then closed and heated to 200° C. within 30 minutes. The autoclave was maintained at this temperature for 120 minutes with the stirrer in operation the whole time. The autoclave was then cooled to about 100° C. and opened. The reaction product from the autoclave was filtered, washed three times with hot water and then dried for 8 hours at 110° C. The weight of the dried product was 73.5 g. An X-ray analysis showed that the product was a dawsonite as is defined in the ASTM spectrographic reference index. No evidence could be found of the presence of any other compound. The chemical analysis of the dried product was as follows:

|  | measured (%) | theoretical (%) |
|---|---|---|
| $CO_2$ | 29.8 | 30.5 |
| $Al_2O_3$ | 34.8 | 35.5 |
| $Na_2O$ | 21.9 | 21.6 |
| $H_2O$ (difference) | 13.5 | 12.4 |

-continued

|  | measured (%) | theoretical (%) |
|---|---|---|
|  | 100.0 | 100.0 |

Examination under the optical microscope showed that the product consisted of long, thin fibrous-shaped crystals which were 10–50 μm long and were 0.5–2 μm in diameter.

EXAMPLE 2

The mother liquor from the previous example was used again after it had been brought to the same bi-carbonate content (140 g/l $NaHCO_3$) as in the first example. In the same autoclave as was used in the first example a suspension containing 40 g aluminum hydroxide was allowed to react for 60 minutes at 200° C. The product of the reaction was then treated as in the previous example. Its weight after drying was 73.2 and its $CO_2$ content 29.9%. The X-ray analysis and the microscopic investigation confirmed the result from example 1.

EXAMPLE 3

The conditions for this trial were the same as in example 1 with the exception of the temperature which in this case was 120 min at 225° C. The reaction product was then treated in the same manner as in example 1. The weight of the dried product was 73.6 g. Microscopic examination showed that the fibrous crystals were 50–100 μm long.

EXAMPLE 4

The reaction suspension was made up of 30 g "Bayer" aluminum hydroxide (grain size 1–20 μm), 20.0 g of the dawsonite obtained in example 3, 158.0 g $NaHCO_3$ and 1.5 l water. The suspension was heated to 220° C. in the autoclave and held at this temperature for 120 min. The reaction product was then treated as in the previous examples. The weight of the dried product was 75.0 g, including the 20.0 g of dawsonite seeding crystals. Microscopic examination showed that the product consisted of dawsonite crystals which were 100–150 μm long.

EXAMPLE 5

The previous examples have already shown that the length of crystalline fibers obtained depends on the treatment temperature. This will be made clearer by the present example in which the same reaction conditions as before were employed, with the exception of the temperature. The following results were obtained:

| Reaction Temperature (°C.) | Approx. length of fibers (μm) |
|---|---|
| 190 | 10 – 30 |
| 200 | 20 – 50 |
| 225 | 50 – 100 |

What is claimed is:

1. A process for the production of a basic pure aluminum-sodium carbonate of the dawsonite type by reacting aluminum tri-hydroxide obtained from the Bayer process with an aqueous sodium bi-carbonate solution wherein the conversion to dawsonite is in the order of 98.5 to 99.5% comprising carrying out the reaction at a temperature between 160° and 240° C. and under a pressure of between 5 and 50 atm. in an aqueous suspension which is agitated by stirring whereby the length of the crystalline fibers increase with a corresponding increase in the reaction temperature.

2. A process according to claim 1 wherein a sodium carbonate solution containing 40–250 g/l $NaHCO_3$ is employed.

3. A process according to claim 1 wherein a suspension containing a molar ratio of reagents ($Na_2O/Al_2O_3$) of 2–6 is employed.

4. A process according to claim 1 wherein the duration of the reaction is 20–40 minutes.

5. A process according to claim 4 wherein the duration of the reaction is 20–180 minutes.

6. A process according to claim 1 wherein before the start of the reaction, dawsonite seed crystals are added to the aqueous suspension.

7. A process according to claim 6 wherein the quantity of seed crystals is between 5 and 50 wt. % of the resultant product.

* * * * *